May 13, 1969  T. T. MATSUMOTO  3,443,703
DUMPING APPARATUS
Filed Jan. 16, 1967

INVENTOR.
TOM T. MATSUMOTO
BY
Paul B. Dike
PATENT AGENT

United States Patent Office 3,443,703
Patented May 13, 1969

3,443,703
DUMPING APPARATUS
Tom T. Matsumoto, 826 S. Mary,
Sunnyvale, Calif. 94087
Filed Jan. 16, 1967, Ser. No. 609,671
Int. Cl. B60p 1/38
U.S. Cl. 214—82     5 Claims

ABSTRACT OF THE DISCLOSURE

Dumping apparatus for unloading the cargo body of a truck including an elongated belt supported for powered movement within the cargo body from its front to its rear open end to carry and dump the cargo.

---

The present invention relates generally to the art of material and more particularly to dumping apparatus for unloading sand, gravel or other materials from the cargo body of a truck or trailer.

Innumerable mechanisms are commercially available for loading sand, gravel or the like into conventional dump trucks which are provided with a pivoted cargo body and associated mechanism for lifting this body when the cargo is to be unloaded therefrom. In addition to the obvious expensive nature of this mechanism which must be of sufficient strength to lift the heavy cargo together with the cargo body itself, it is well known that the lifting of the cargo for dumping or unloading purposes raises the center of gravity of the entire structure and, as a consequence, such conventional dump trucks have not infrequently overturned when unloading on a slope.

Accordingly, it is a general object of the present invention to provide a relatively simple and inexpensive dumping apparatus operable to unload a cargo such as sand, gravel or the like from the body of a truck or trailer.

More particularly, it is a feature of the invention to provide a dumping apparatus in the form of a belt upon which the cargo is received and which can be subsequently operated to shift the cargo to effect unloading thereof.

Additionally, it is a feature of the invention to provide a dumping apparatus which can be readily applied to existent cargo bodies on trucks or trailers without expensive modification thereof.

It is yet a further feature of the invention to provide a dumping apparatus which can be readily applied to the cargo body of an existent truck or trailer in a manner so that cooperative support of the sand, gravel or other cargo is provided, and no lifting of the cargo is necessary during the unloading operation.

Yet a further of the invention is the provision of a dumping apparatus which is operable to quickly unload a cargo and is also quickly returned to its cargo receiving position on the truck or trailer.

Figure 1:
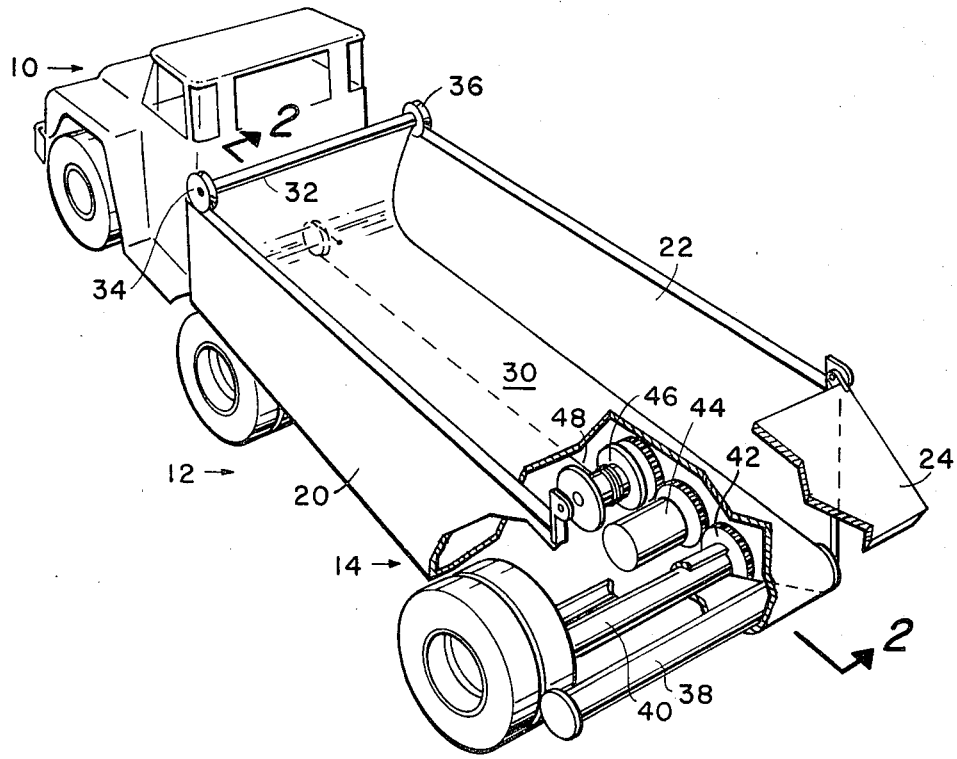
Figure 2:
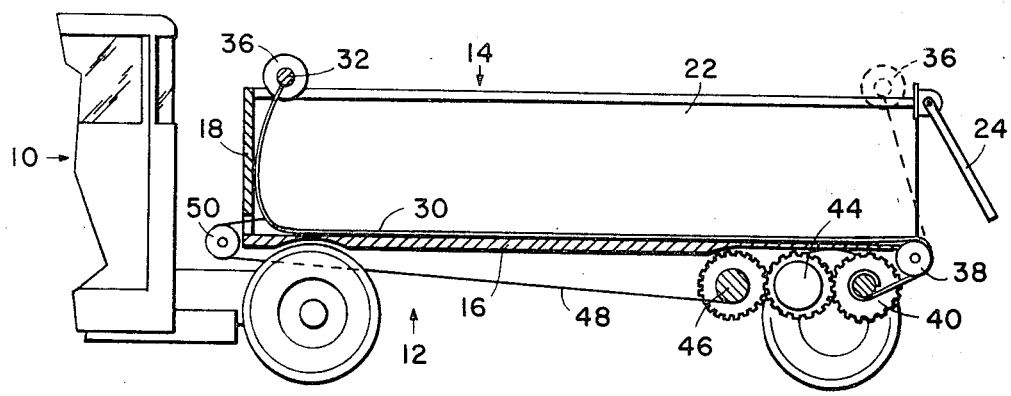

These as well as other objects and features of the invention will become more apparent from a perusal of the following description of the exemplary structure shown in the accompanying drawing wherein:

FIG. 1 is a rear perspective view of a truck-trailer with a dumping apparatus embodying the present invention mounted thereon, parts of the structure being broken away to enable illustration of details, and FIG. 2 is a central sectional view taken along line 2—2 of FIG. 1 diagrammatically illustrating operation of the dumping apparatus.

As shown in the drawing, the dumping apparatus is mounted on a truck-trailer structure of a conventional type including a motor truck 10 which supports at its rear end the forward portion of a trailer 12, the rear portion of the trailer being supported by additional wheels.

As shown, the trailer 12 includes a cargo body 14 also of a generally conventional type having a flat bottom or platform 16 surrounded on three sides by an upstanding front wall 18 and parallel side walls 20, 22. At its rear end, a conventional tailgate 24 is pivoted from its upper extremity suspended between the side walls 20, 22. As thus far described, the structure is conventional and no further details thereof need be presented. However, it is to be expressly understood that the dumping apparatus embodying the present invention can not only be applied to this type of structure, but any cargo body of a generally similar nature.

The cargo unloading element of the dumping apparatus includes an elongated belt 30 which is received within the cargo body 14 and generally is adapted to shift cargo placed on its upper surface to and through the pivoted tailgate 24 to effect the unloading operation. As a consequence, the width of the dumping belt is slightly less than the distance between the sidewalls 20, 22 of the cargo body 14 so that a major portion thereof can be received flatly on the bottom 16 of the cargo body, as shown in full lines in FIGS. 1 and 2. In length, the belt 30 is longer than the longitudinal dimension of the cargo body 14 and in its inoperative or load-receiving position, the forward portion of the belt extends vertically for connection at its uppermost end to a shaft 32 which spans the width of the cargo body 14 and carries at its opposite extremities for free rotation, a pair of wheels or rollers 34, 36 which are specifically formed for rolling support on the upper edges of the side walls 20, 22 of the cargo body, which edges therefore form a pair of tracks. In many instances, the sidewalls 20, 22 of a cargo body 14 are adapted for such support without any modification but, if not, a simple track structure can be bolted to the upper edges of the cargo body sidewalls to present an appropriate surface for rolling support of the two wheels 34, 36.

At the opposite or rear open end of the cargo body 14, the belt 30 passes downwardly around an idler roller 38 suitably supported for rotation beyond the extremity of the cargo body bottom or platform 16 and thereafter extends in a reverse direction for connection at its extremity to a takeup reel 40 suitably supported under the cargo body. A gear drive connection 42 is made between the takeup reel 40 and suitable drive means 44 can take the form of an electric or hydraulic motor which, in turn, can be suitably energized from a hydraulic pump or generator (not shown) driven by the engine of a motor truck. The hydraulic or electrical connections are made so that the motor 44 can be driven in each of two directions to effect, alternatively, an unloading or dumping operation or a return of the belt 30 to the illustrated cargo-receiving position within the cargo body 14.

If it is assumed that the dumping belt 30 is in the position illustrated in full lines in FIGS. 1 and 2, and a cargo such as sand or the like has been placed thereover, it will be readily apparent that the belt will rest on the bottom or platform 16 of the cargo body 14 which latter, in turn, will substantially entirely carry the weight of such cargo. If such a cargo is then to be unloaded, the drive motor 44 is energized to rotate the takeup reel 40 in a clockwise direction as viewed in FIG. 2 and the dumping belt 30 supported on the bottom of the cargo body 14 will be moved from left to right as viewed in FIG. 2 to initiate dumping or unloading of sand through the tailgate 24 of the cargo body. To accommodate such belt movement, the remote extremity of the belt 30 supported from the rollers 34, 36 will also shift rearwardly and such rollers or wheels will, in turn, roll along the tracks formed on the upper edges of the sidewalls 20, 22. Thus, the entire cargo of sand will be shifted gradually rearwardly until the vertical section of the dumping belt 30 comes to a position adjacent the tailgate 24 and still suspended from the rollers as shown in phantom lines in FIG. 2. Thus, the dumping operation is completed and if desired, the belt can be manually returned to its initial cargo-receiving position.

However, in view of the fact that the drive motor 44 must be energized in an opposite or counter-clockwise direction, to enable such return of the dumping belt 30 to its cargo-receiving position, it is preferred that another connection be made to the belt to obviate the necessity of any such manual return. For this latter purpose, the drive motor 44 also is connected to a cable reel 46 having one end of a cable 48 connected thereto. From such connection, the cable 48 extends underneath the platform 16 of the cargo body 14 and thence around an idler pulley 50 and through a small opening for connection to the under surface of the belt 30 at a position spaced from the remote supported end of the belt 30 on the roller-supported shaft 32 approximately equivalent to the vertical dimension of the cargo body sidewalls 20, 22. Accordingly, when the drive motor 44 is energized in the reverse direction, the described cable 48 will effect a pulling of the belt 30 from its phantom line disposition in FIG. 2 to the full line disposition, the takeup reel 40 being energized in the reverse direction at the same time to allow the dumping belt 30 to unwind therefrom.

In view of the fact that the cargo is mainly supported by the bottom or platform 16 of the cargo body 14, a relatively lightweight, flexible dumping belt 30 can be used even though the loads are relatively heavy. In practice, a reinforced, flexible belt having a thickness of $\frac{7}{16}$ of an inch has been found to be very practical. Furthermore, when such dumping belt 30 ultimately does have to be replaced, its removal and replacement by a new belt is a relatively simple operation, as will be obvious. Furthermore, it will also be obvious that substantially no modifications to an existent cargo body 14 are necessary for installation of the described structure. The takeup reel 40 and drive mechanism 44 can be mounted below the cargo body 14 in any suitable fashion and without any modification and, in most cases, there is no requisite modification of the upper edges of the sidewalls 20, 22 to receive the belt-supporting rollers 34, 36.

It will be apparent that various alterations and/or modifications to the structure as described can be made without departing from the spirit of the invention, and as a consequence, the foregoing description of one embodiment of the invention is to be considered purely as exemplary and not in a limiting sense and the actual scope of the invention is to be indicated only by reference to the appended claims.

What is claimed is:

1. Dumping apparatus for unloading a cargo body having upright side walls and an open end which comprises
    a cargo belt having a length greater than the cargo body and a width slightly less than the cargo body width,
    means attached to one end of said belt and mounted for movement longitudinally of the cargo body including a pair of wheels mounted to roll along the upper edges of the body side walls, and
    means attached to the remote end of said belt and operable to move said belt toward the open end of the cargo body including take-up means mounted adjacent the open end of the cargo body and attached to the remote end of said belt so that the same may be accumulated thereby.

2. Dumping apparatus according to claim 1 wherein said belt-return means includes at least one cable connected to said belt at a position spaced from its end attached to said wheel means a distance approximately equal to the vertical dimension of the cargo body sidewalls.

3. Dumping apparatus according to claim 1 wherein
    said take-up means includes a take-up reel mounted for rotation below the open end of said cargo body, and
    said belt-moving means also includes an idler roller mounted for rotation beyond the open end of said cargo body.

4. Dumping apparatus according to claim 3 which comprises drive means operable to effect rotation of said take-up reel in opposite directions selectively.

5. Dumping apparatus according to claim 4 which comprises belt-return means operably connected to said drive means for moving said belt away from the open end of the cargo body.

References Cited

UNITED STATES PATENTS

| 2,264,157 | 11/1941 | Baker et al. | 214—83.34 XR |
| 2,355,226 | 8/1944 | Mallory | 214—83.34 |
| 2,448,122 | 8/1948 | Recker | 214—83.34 |

FOREIGN PATENTS

| 833,722 | 3/1952 | Germany. |
| 799,138 | 8/1956 | Great Britain. |
| 79,988 | 12/1955 | Netherlands. |

ALBERT J. MAKAY, *Primary Examiner.*

U.S. Cl. X.R.

214—83.34